(12) United States Patent
Boyko et al.

(10) Patent No.: US 7,984,019 B2
(45) Date of Patent: Jul. 19, 2011

(54) METHOD AND APPARATUS FOR LOADING DATA FILES INTO A DATA-WAREHOUSE SYSTEM

(75) Inventors: Adrian Boyko, Tucson, AZ (US); Zach Heidepriem, San Jose, CA (US); William Oliver, Tucson, AZ (US); Wojciech Wyzga, Tucson, AZ (US)

(73) Assignee: Knowledge Computing Corporation, Tucson, AZ (US)

( * ) Notice: Subject to any disclaimer, the term of this patent is extended or adjusted under 35 U.S.C. 154(b) by 516 days.

(21) Appl. No.: 12/171,991

(22) Filed: Jul. 11, 2008

(65) Prior Publication Data
US 2009/0172047 A1    Jul. 2, 2009

Related U.S. Application Data

(60) Provisional application No. 61/017,492, filed on Dec. 28, 2007.

(51) Int. Cl.
G06F 7/00 (2006.01)
G06F 17/00 (2006.01)
(52) U.S. Cl. .................. 707/647; 707/641; 707/649
(58) Field of Classification Search .................. None
See application file for complete search history.

(56) References Cited

U.S. PATENT DOCUMENTS

| | | | |
|---|---|---|---|
| 5,864,851 A * | 1/1999 | Breitbart et al. | 1/1 |
| 6,912,549 B2 | 6/2005 | Rotter et al. | |
| 2003/0195877 A1 | 10/2003 | Ford et al. | |
| 2005/0080821 A1 * | 4/2005 | Breil et al. | 707/104.1 |
| 2005/0147947 A1 | 7/2005 | Cookson et al. | |
| 2005/0222989 A1 | 10/2005 | Haveliwala et al. | |
| 2006/0031268 A1 * | 2/2006 | Shutt et al. | 707/202 |
| 2006/0195461 A1 | 8/2006 | Lo et al. | |
| 2006/0242205 A1 * | 10/2006 | Schmidt et al. | 707/200 |
| 2009/0177647 A1 | 7/2009 | Oliver et al. | |
| 2009/0307184 A1 | 12/2009 | Inouye et al. | |
| 2010/0030750 A1 | 2/2010 | Oliver | |

OTHER PUBLICATIONS

M. Kaczmarski; Beyond Backup Toward Storage Management; 2003; IBM Business Jourbal;pp. 322-337.*
Heather McCallum-Bayliss, Identity Resolution in a Global Environment: Fishing for People in a Sea of Names, 2004 IEEE, pp. 21-26.
Hector Garcia-Molina, Entity Resolution: Overview and Challenges, 2004, pp. 1-2.
Hector Garcia-Molina, Pair-wise entity resolution: Overview and challenges, 2006 ACM, p. 1.
Lu et al, Query evaluation and optimization in deductive and object-oriented spatial databases, 1995IST, pp. 131-143.

* cited by examiner

*Primary Examiner* — Neveen Abel Jalil
*Assistant Examiner* — Jermaine Mincey
(74) *Attorney, Agent, or Firm* — Oppedahl Patent Law Firm LLC

(57) ABSTRACT

Date-warehouse systems are populated using an enhanced Extraction-Load-Transform (ETL) process and system by employing three ideas: Out-of-order-fill ETL, relative-ordering index (ROI), and dependent queries. Out-of-order-fill ETL allows a data warehouse to accept the loading of data files in any order, and does not require the loading of any previous backup data files in order to provide some functionality to end users under the view that some functionality or data access is better than none at all. Dependent queries are processes that use defined data structures for use in constructing, extracting, and validating each record to be written in said data-warehouse system in order to ensure that referential integrity is maintained and that no orphaned data is pushed into the data warehouse. Finally, ROI is a process wherein a value is determined, based on the constraints of the source data, which indicates the relative newness of the data.

12 Claims, 5 Drawing Sheets

METHOD AND APPARATUS FOR LOADING DATA FILES INTO A DATA-WAREHOUSE SYSTEM

CROSS-REFERENCE TO RELATED APPLICATIONS

This application claims priority from U.S. application No. 61/017,492, filed Dec. 28, 2007, which application is incorporated herein by reference for all purposes.

BACKGROUND OF THE INVENTION

When performing Extraction-Load-Transform (ETL) from a large dataset (Source) into a warehouse or data-mart application (Destination), it may take from days to months to complete the operation, depending on the size and complexity of the data and the transformation being performed. Additionally, once the data is loaded, it needs to be synchronized (Refreshed) with the Source data when it changes.

Traditionally, however, a Destination would be required to wait for the initial ETL to finish before the Refresh occurs, causing obvious efficiency problems. The initial ETL would start with the oldest data in the system and process until it has reached the most current data in the Source system. The reason to do this was technology-bound: When processing a dataset, previous data was required before updates to that data could be processed. A Refresh could not be started until all previous data was processed because any updates would be lost and technology would not know what to do with the partial information.

Consequently, this limitation would result in significant loss of time for a data-warehouse application waiting for the historical data to be loaded. In fact, systems could not be declared "operational" until data was loaded because the most important and useful information, namely the most current data, was processed last. Customers would not like this, but they know that there was no choice, since that is how ETL traditionally was done.

ETL processes can be quite complex, and significant operational problems can occur with improperly designed ETL systems. The range of data values or data quality in an operational system may be outside the expectations of designers at the time validation and transformation rules are specified. Data-profiling of a Source during data analysis is recommended to identify the data conditions that will need to be managed by transform rules specifications. This will lead to an amendment of validation rules explicitly and implicitly implemented in the ETL process.

Data warehouses are typically fed asynchronously by a variety of Sources which all serve a different purpose, resulting in, for example, different reference data. ETL is a key process to bring heterogeneous and asynchronous Source extracts to a homogeneous environment.

The scalability of an ETL system across the lifetime of its usage needs to be established during analysis. This includes understanding the volumes of data that will have to be processed within service level agreements (SLAs). The time available to extract from Source systems may change, which may mean the same amount of data may have to be processed in less time. Some ETL systems have to scale to process terabytes of data to update data warehouses with tens of terabytes of data. Increasing volumes of data may require designs that can scale from daily batch to intra-day microbatch to integration with message queues or real-time change data capture (CDC) for continuous transformation and update.

To meet these challenges, a recent development in ETL software is the implementation of parallel processing. This has enabled a number of methods to improve overall performance of ETL processes when dealing with large volumes of data. There are 3 main types of parallelisms as implemented in ETL applications:

Data—By splitting a single sequential file into smaller data files to provide parallel access.

Pipeline—Allowing the simultaneous running of several components on the same data stream. An example would be looking up a value on record 1 at the same time as adding together two fields on record 2.

Component—The simultaneous running of multiple processes on different data streams in the same job. Sorting one input file while performing a de-duplication on another file would be an example of component parallelism.

All three types of parallelism are usually combined in a single job. However, an additional difficulty is making sure that the data being uploaded is relatively consistent. Since multiple-Source databases all have different update cycles (for example, some may be updated every few minutes, while others may take days or weeks), an ETL system may be required to hold back certain data until all Sources are synchronized. Likewise, where a data warehouse may have to be reconciled to the contents in a Source system or with the general ledger, establishing synchronization and reconciliation points is necessary.

It should be noted that nowhere in the above-discussed parallelism solutions is a mention of being able to process starting in the middle of a data feed, processing forward and backward, or of optimizing how data is queried from the Source systems, which are concepts that would ETL significantly better.

BRIEF SUMMARY OF THE INVENTION

The invention solves the problems associated with inefficient and unreliable data-warehouse population using Extraction-Load-Transform (ETL) by employing three ideas: Out-of-order-fill ETL, dependent queries, and relative-ordering index (ROI). These ideas can be typically employed in law-enforcement records systems (such as COPLINK systems), but is certainly not limited to such an application.

Out-of-order-fill ETL breaks from the traditional approach of loading the oldest full-backup data file into a data warehouse first, followed by subsequent loads of partial-backup data files based on their chronological order, where the data warehouse is not usable until all data has been properly validated and loaded. Out-of-order-fill ETL allows a data warehouse to accept the loading of any backup data files in any order, and does not require the loading of all previous backup data files in order to provide some functionality to end users under the view that some functionality or data access is better than none at all. This is especially true for critical systems such as law-enforcement databases in which even a partial dataset may help solve a crime.

Dependent queries are processes that use defined data structures for use in constructing, extracting, and validating each record to be written in said data-warehouse system. Each dependent query populates a data-containing unit with a record's data extracted and validated from a first backup data file, then pushes the data-containing unit into an ETL program. The advantage here is that referential integrity of all data pushed into the ETL program is assured. Then, additional queries are performed for all related entity data, which is then also pushed into the ETL program. Once again, referential integrity is maintained and no orphaned data is ever pushed into the ETL program, which in turn enhances the reliability of what finally ends up populating the data warehouse.

ROI is a process wherein a value is determined, based on the constraints of the source data, which indicates the relative newness of the data. Often, this value is a simple "Modified Date," but may be another value. As an example, when the ROI is a "Modified Date" value, a simple date comparison can be used to determine if a piece of information is older or newer, and thus be processed or thrown away. The ROI is important because it enables out-of-order-fill ETL processing of backup data files so that old data does not overwrite newer data.

It should be noted that the above-described innovations are not limited to the restoration of data from backup files. These innovations can also be effectively applied to live, in-use data-sources used to gather and populate a new data repository.

BRIEF DESCRIPTION OF THE DRAWINGS

FIG. 2 depicts one embodiment of an ROI process.

DETAILED DESCRIPTION

Introduction

The overall invention solves the problems associated with inefficient and unreliable data-warehouse population using Extraction-Load-Transform (ETL) by employing three ideas: Out-of-order-fill ETL, relative-ordering index (ROI), and dependent queries. These ideas can be typically employed in law-enforcement records systems (such as COPLINK systems), but is certainly not limited to such an application.

First Embodiment

Out-of-Order-Fill ETL

Overview

Figure 1:
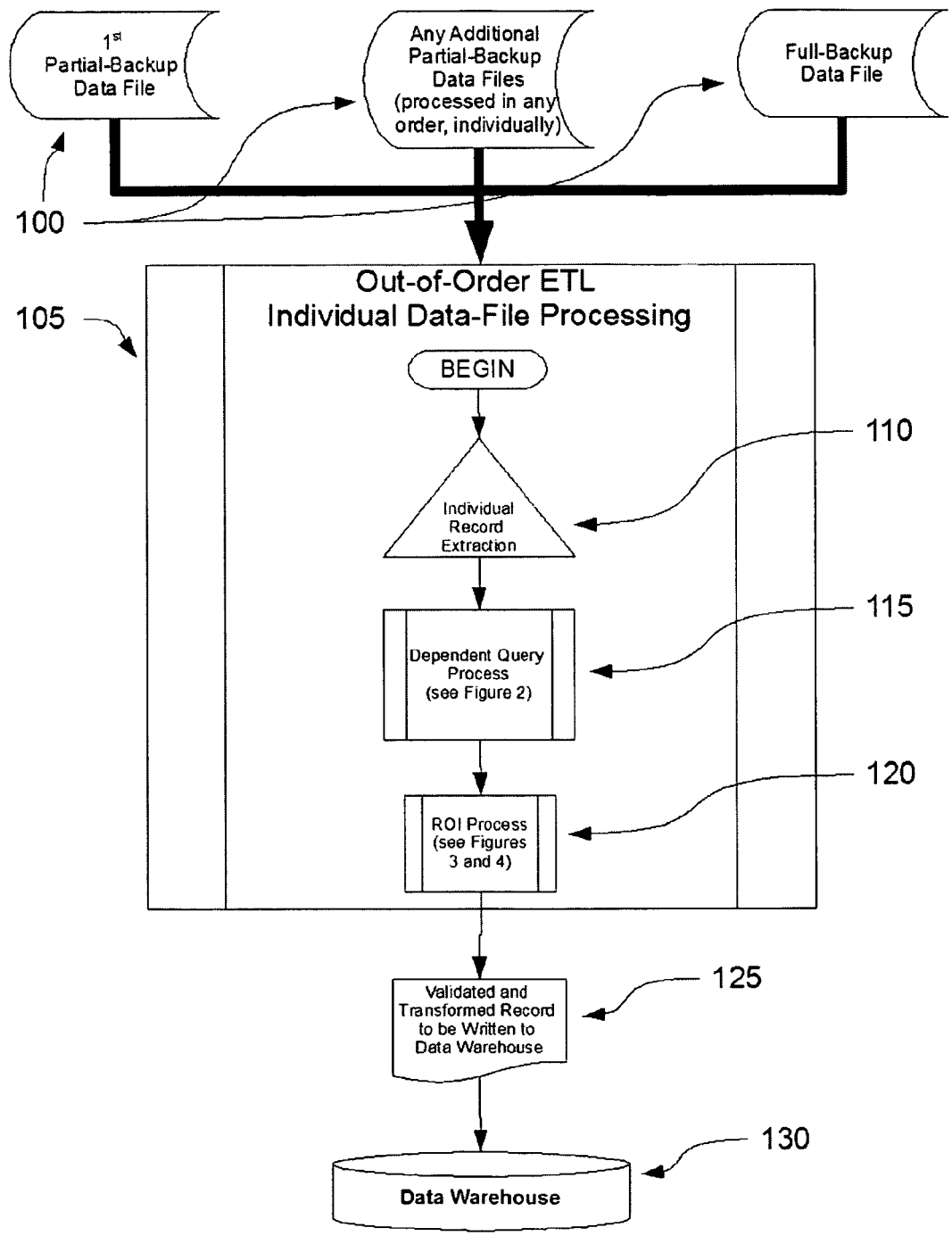
FIG. 1 depicts one embodiment of the overall Out-of-Order-Fill ETL method.

Out-of-order-fill ETL breaks from the traditional approach of loading the oldest full-backup data file into a data warehouse first, followed by subsequent loads of partial-backup data files based on their chronological order, where the data warehouse is not usable until all data has been properly validated and loaded. Refer to FIG. 1. Out-of-order-fill ETL allows a data warehouse (130) to accept the loading of any backup data files (100) in any order, and does not require the loading of all previous backup data files in order to provide some functionality to end users under the view that some functionality or data access is better than none at all. This is especially true for critical systems such as law-enforcement databases in which even a partial dataset may help solve a crime.

In a preferred embodiment, out-of-order-fill ETL (105) incorporates dependent queries (125) and/or relative-ordering index (ROI) (130), both of which are discussed in detail below. Consequently, data can be loaded into a data warehouse at any point in the lifespan of the source data—the most current information can be inserted immediately. An out-of-order-fill ETL process can be started so that historical data will be loaded, starting with the most current data and moving backwards in history, to fill-in older information.

Dependent Queries

Figure 2:
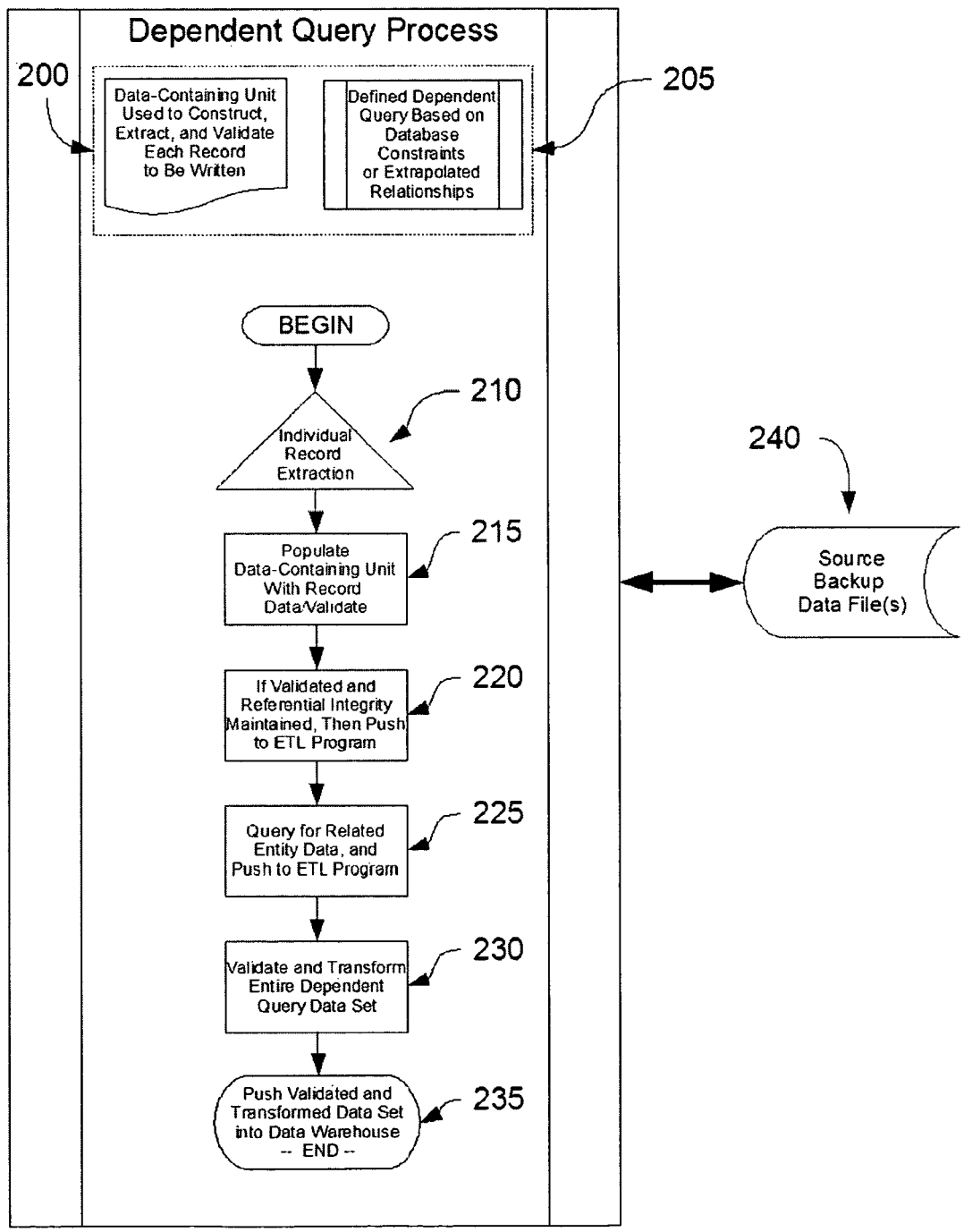
FIG. 2 depicts one embodiment of the dependent query process.

Dependent queries are processes that use defined data structures for use in constructing, extracting, and validating each record to be written in said data-warehouse system in order to ensure referential integrity and the reliability of data that ends up being pushed into a data warehouse. Refer to FIG. 2.

Commonly in existing ETL applications, an ETL tool would load, for example, all PERSONNAMES, then load all ADDRESSES, and so on. As a result, a data warehouse would end up with large amounts of unusable, fragmented data that may suffer from referential integrity constraint violations. This is because in such a case, no check could be done to determine whether data being pushed was valid with other data. Additionally, if data from tables were pushed in the wrong order, database errors would occur when attempting to link, via Primary-Foreign key constraints, since there would be missing data, and significant time would be lost in redoing and testing the ETL.

To avoid these problems, each defined dependent query (205) populates (210) a data-containing unit (200) with a record's data extracted and validated from a backup data file (240), then pushes the data-containing unit into an ETL program (220). The advantage here is that referential integrity of all data pushed into the ETL program is assured. Then, additional queries are performed for all related entity data (225), which is then also pushed into the ETL program (225). Once again, referential integrity is maintained and no orphaned data is ever pushed into the ETL program, which in turn enhances the reliability of what finally ends up populating the data warehouse (230, 235).

In a law-enforcement application, for example, the primary data-containing unit is a "Document." A Document represents incidents and reports such as Departmental Reports, Field Interviews, Dispatches, Intelligence Reports, Forms, and so on. A Document then consists of elements such as Persons involved in a report (such as Victims, Suspects, and so on), Locations (such as incident location, home locations, etc.), Organizations, Weapons, Properties, Securities, and other linking documents.

A dependent query is set up based on database constraints or extrapolated relationships. The dependent query is instructed to first push the Document into the ETL tool, which then processes the data into the data warehouse. The dependent query than queries for all related Objects (e.g., persons, locations, vehicles, etc.), and pushes all relevant data to the ETL process. All related information associated with those Objects (such as identifiers, demographics, etc.) are also pushed into the ETL system.

Using dependent queries in conjunction with ETL prevents a Primary-Foreign key constraint violation due to bad data in the source because the dependent query ensures that orphaned data is never pushed. Additionally, data is more-quickly made available and useful to the data warehouse since entire data-containing units (e.g., Documents) plus all related data are transferred to the data warehouse as a group. Finally, the use of dependent queries gives greater control to the ETL tool to filter and process data.

Relative-Ordering Index (ROI)

Figure 3:
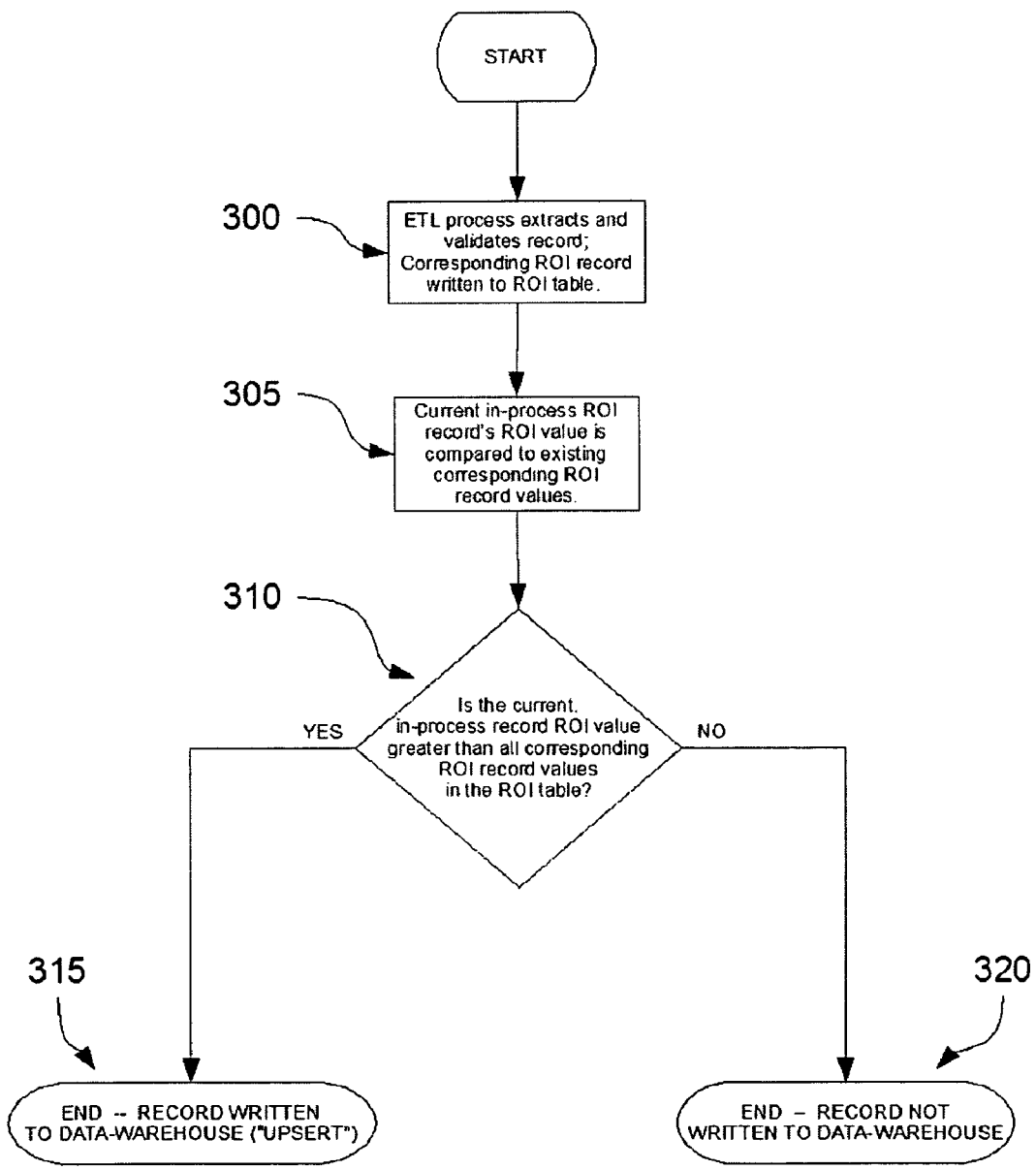

ROI is a process wherein a value is determined, based on the constraints of the source data, which indicates the relative newness of the data. Refer to FIG. 3. Often, this value is a simple "Modified Date," but may be another value. As an example, when the ROI is a "Modified Date" value, a simple date comparison can be used to determine if a piece of information is older or newer, and thus be processed or thrown away. The ROI is important because it enables out-of-order-fill ETL processing of backup data files so that old data does not overwrite newer data. In a typical embodiment, an ROI table is set up that keeps track of each ETL query (300) such that corresponding records will have their ROI values compared (305) and a decision is made by the system (310) on whether to either push a record into the data warehouse, thus overwriting an existing corresponding record (315). A source data key must be identified that can be used to identify a distinct piece of information. An example of this is a Primary key from the source system. Since Primary keys from multiple-source systems may be identical, an identifier must be applied to each source of a record, and a composite key is used.

For example, an ROI table may look as follows:

| Data-Source Name | Query Name | Primary Key/ Composite Key | Relative Ordering Index Value |
|---|---|---|---|
| CMPD_RMS | Event | \<key1>123\</key1> \<key2>1\</key2> | 1-Jan-1999 |

Additionally, no special handling procedures need to be performed for deleted records in the source files because those records are inserted into the ROI table (300); therefore, the older records will fail the ROI test and not be pushed into the data warehouse (320).

As previously discussed, ROI values are not limited to a "Modified Date." Other values and strategies may be suitable candidates to act as ROI values. The following table provides some examples:

| Example ROI Values and Strategies | |
|---|---|
| Data-Source Type | ROI Value/Strategy |
| Any data source containing modified date | Modified Date/compare |
| RDBMS (without modified dates) | Refresh can be broken into separate parts: A reverse or backward-fill migration and a forward-fill migration. Mark the ROI value for the reverse migration with a designated value, such as "0", and new data with the date the record was pushed so that old data never overwrites new data. The old data, upon first encounter, will insert; however, any additional records in the old dataset will be ignored. The forward-migration acts as traditional ETL, where newer records always overwrite. |
| Flat-File, including xml files (without modified dates) | The refresh stream is marked with the record-push date, whereas the historical load is always marked with a designated value, such as "0", indicating that it is never the newest data. |
| Message Switch, such as MSMQ (without modified dates) | Received Sequence Number: Newer data is always pushed, never older data. |

It is important to note that in many cases, there may be various backup data files for which there is no stored or clear means to ascertain the relative age of a given record with in a backup data file, such as a Modified Date field. Consequently, human intervention is sometimes required to not only look at the records involved, but to also look at the physical characteristics and circumstances surrounding a given backup data file in order to determine the relative newness of files. For example, a backup file might be stored on a tape drive that has a label affixed to it describing a date or circumstance surrounding the backup, which could help in this determination. In such cases, the human users may choose to use the best information available to assign records within a designated backup data file as the starting point for a reverse or backward-fill migration scheme, as discussed in the second item of the Example ROI Values and Strategies table above, and depicted in FIG. 4 for the following example.

Example of Out-of-Order-Fill ETL With ROI Logic

The typical process and logic to determine whether an incoming record should be inserted, updated, or deleted is as follows:

Let T be the ROI table (proposed earlier in this embodiment).

For each incoming record R with Primary (or Composite) key p and ROI n, IF there does not exist a record in T with Primary (or Composite) key p, AND IF ROI>n, THEN push R and upsert T. ELSE, ignore R.

NOTE: "Push", in the context of ETL, defines the action of moving a record to the next stage in the ETL process, in this case, the Transform stage. "Upsert" is a SQL-like statement that inserts a record to a database table if the record does not yet exist in the table; if the record already exists, an update operation is performed. "Upsert" is not a standard SQL statement, but is a term frequently used to abbreviate the equivalent pseudo-code. SQL:2003 defines a MERGE statement that provides similar functionality.

Figure 4:
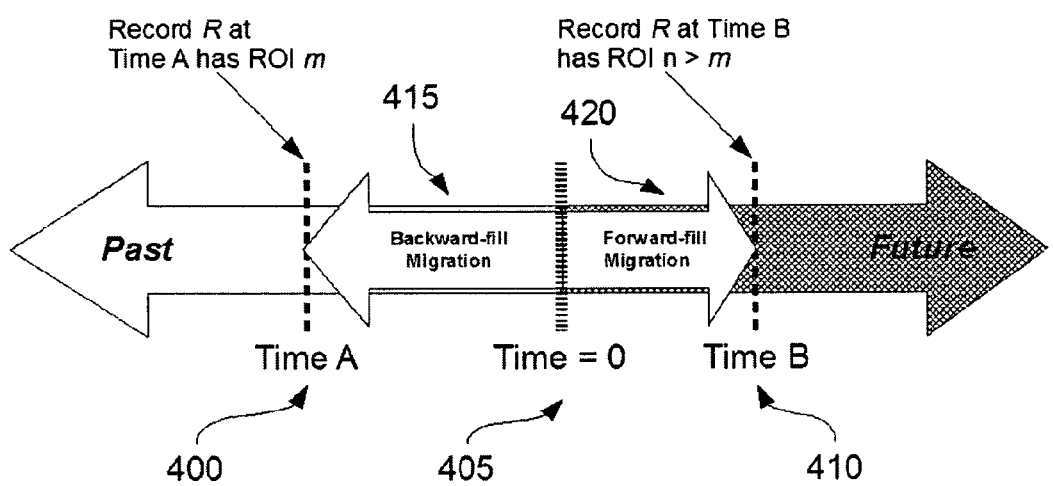
FIG. 4 depicts a visual representation of typical ROI logic.

Refer to FIG. 4. If the forward-fill migration (420) reaches Time B (410) before the backward-fill migration (415) reaches Time A (400), then the backward-fill migration (415) must ignore record R when it is found at Time A (400). Time=0 (405) represents the time when the ETL process was started.

Using out-of-order-fill ETL in conjunction with ROI and dependent queries, a usable data warehouse can be create much quicker and with greater reliability than with the prior art, since newer data is loaded first and orphaned data is never pushed into the data warehouse.

Second Embodiment

Method for Applying Out-of-Order-Fill ETL Principles to Live Data Sources

While the first embodiment focuses on the application of the principles described above to the restoration of backup data sources, it should be appreciated by one ordinarily skilled in the art that these same concepts can be applied to the creation of usable databases by extraction and/or derivation of data from live (i.e., in-use) data sources. The only difference is that the source data is not necessarily coming from one or more backup data files. Rather, a user may be motivated to create a new data warehouse, or enhance an existing data warehouse, by extracting data from one or more live data sources.

In this case, the dependent query and ROI concepts described in the first embodiment become especially important, particularly if the source data being extracted comes from multiple and disparate data sources. It does not matter what order the various data sources are mined for extracted data and made available for upserting into the target data warehouse—reasonable confidence can be had in the final product because of the application of dependent queries and ROI to ensure that complete and up-to-date records are entered.

As discussed in detail in the first embodiment, specialized data-containing units are defined for the records to be finally pushed into the target data warehouse. Corresponding dependent queries are defined to populate their associated data-containing units, including supplemental data queries to gather all related entity data, which is then also pushed into the ETL program, which validates and transforms the gathered data. The dependent query process ensures that referential integrity is maintained and that no orphaned data is ever pushed into the ETL program, which in turn enhances the reliability of what finally ends up populating the data respository.

Finally, as each dependent query is completed, the ROI process is applied, in the same way described in detail in the first embodiment, with the goal of ending up with the newest data records stored in the target data warehouse.

Third Embodiment

Method for Out-of-Order-Fill ETL

This embodiment (refer to FIGS. 1 through 4) encompasses a method for populating a data-warehouse to be employed in a data-warehouse system wherein there is to be data loaded or restored for use, with the data-warehouse system having at least one computing device communicatively coupled with a large dataset, said large dataset having at least one storage device, said at least one storage device containing a full-backup data file and at least one partial-backup data file, said data files containing real-world entity data, and said computing device having a Extraction Load Program (ETL) program to subject the data intended to be loaded to a transform stage according to data-warehouse-specific rules, a method of loading data into a data-warehouse system. The method comprises the step of loading a first partial-backup data file (100), wherein the loading of said first partial-backup data file makes the data in said first partial-backup data file available for use, at a time when no other backup data files have been loaded, and wherein said first partial-backup data file (100) is one partial-backup data file within a series of historical partial-backup files for the data-warehouse system, and wherein said first partial-backup data file is not a full-backup data file.

This method can be further extended by performing the step of loading at least one additional partial-backup data file (100), wherein the loading of each said at least one additional partial-backup data file makes the data in each at least one additional partial-backup data file available for use, at a time when no other backup data files are loaded, wherein said at least one additional partial-backup data file is any partial-backup data file within a series of historical partial-backup files for the data-warehouse system, wherein said at least one additional partial-backup data file (100) is not a full-backup data file, and wherein each record to be extracted (110) from said at least one additional partial-backup data file for loading into said data-warehouse system is only allowed to be written to said data-warehouse system if either the record to be written to said data-warehouse system is not already represented in said data-warehouse system or the record to be written to said data-warehouse system is newer than its corresponding existing record (see FIGS. 3 and 4).

This method can be further extended by loading a full-backup data file (100), wherein each record (110) to be extracted from said full-backup data file (100) for loading into said data-warehouse system is only allowed to be written to said data-warehouse system if either the record to be written to said data-warehouse system is not already represented in said data-warehouse system or the record to be written to said data-warehouse system is newer than its corresponding existing record (See FIGS. 3 and 4).

This method can be further extended by defining a data-containing unit (200) for use in constructing, extracting, and validating each record to be written in said data-warehouse system from the backup file to be loaded; defining a dependent query based on database constraints or based on extrapolated relationships between data fields (205), wherein said dependent query is designed to populate said data-containing unit; performing said dependent query for each record in the backup data file to be loaded, wherein said data-containing unit is populated and pushed into said ETL program (215, 220), wherein referential integrity is maintained for all extracted data that is pushed to said ETL program, and wherein additional queries are made for all related entity data and said related entity data is pushed into said ETL program (225); validating and transforming each said dependent-query data set with said ETL program (230); and pushing only each said validated and transformed data set into said data-warehouse system (235).

This method can be further extended wherein the relative age of the record to be written to said data-warehouse system as compared to its corresponding existing record is determined by comparing the relative ordering indexes of the records (120).

Fourth Embodiment

System for Out-of-Order-Fill ETL

Figure 5:
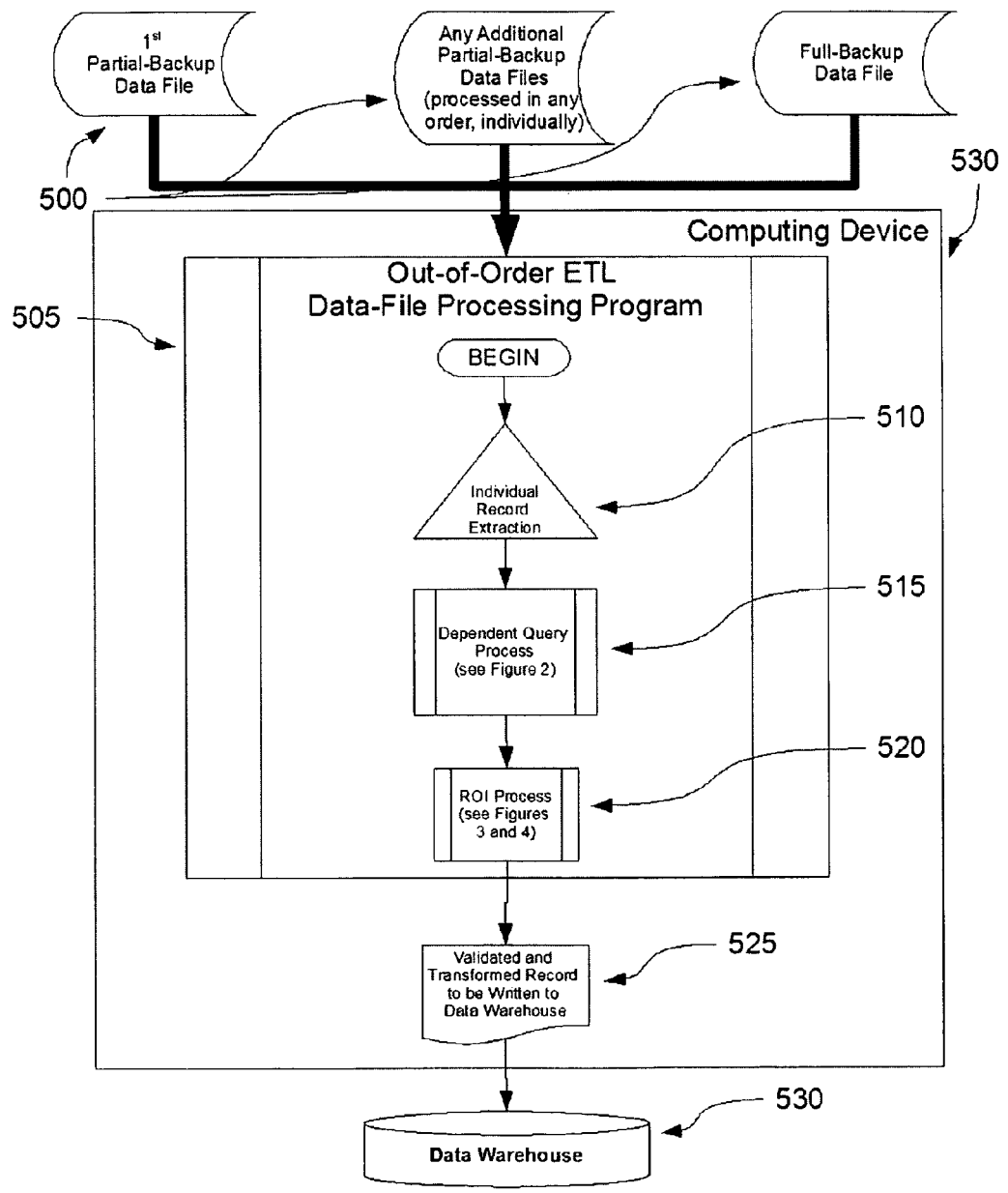
FIG. 5 depicts one embodiment of a data-warehouse system that uses an Out-of-Order-Fill ETL program.

This embodiment (refer to FIG. 5) encompasses a data-warehouse system wherein there is to be data loaded or restored for use, said data-warehouse system having at least one computing device (530) communicatively coupled with a large dataset, said large dataset having at least one storage device, said at least one storage device containing a full-backup data file (500) and at least one partial-backup data file (500), said data files containing real-world entity data, and said computing device having a Extraction Load Program (ETL) program (505) to subject the data intended to be loaded to a transform stage according to data-warehouse-specific rules. The data-warehouse system further comprises a first partial-backup data file (500), wherein the loading of said first partial-backup data file makes the data in said first partial-backup data file available for use, at a time when no other backup data files have been loaded, wherein said first partial-backup data file is one partial-backup data file within a series of historical partial-backup files (500) for the data-warehouse system, and wherein said first partial-backup data file is not a full-backup data file.

The data-warehouse system can be further extended by adding at least one additional partial-backup data file (500), wherein the loading of said at least one additional partial-backup data file makes the data in each said at least one additional partial-backup data file available for use, at a time when no other backup data files have been loaded, wherein said at least one additional partial-backup data file is any partial-backup data file within a series of historical partial-backup files for the data-warehouse system, wherein said at least one additional partial-backup data file is not a full-backup data file, and wherein each record to be extracted (510) from said at least one additional partial-backup data file for loading into said data-warehouse system is only allowed to be written to said data-warehouse system if either the record to be written to said data-warehouse system is not already represented in said data-warehouse system or the record to be written to said data-warehouse system is newer than its corresponding existing record (520).

The data-warehouse system can be further extended by adding a full-backup data file (500), wherein each record to be extracted from said full-backup data file for loading into said data-warehouse system is only allowed to be written to said data-warehouse system if either the record to be written to said data-warehouse system is not already represented in said data-warehouse system or the record to be written to said data-warehouse system is newer than its corresponding existing record (520).

The data-warehouse system can be further extended by adding a defined data-containing unit (515) for use in constructing, extracting, and validating each record to be written in said data-warehouse system from the backup file to be loaded; a defined dependent query (515) based on database constraints or based on extrapolated relationships between data fields, wherein said dependent query is designed to populate said data-containing unit; a program to perform said dependent query (515) for each record in the backup data file to be loaded, wherein said data-containing unit is populated and pushed into said ETL program, wherein referential integrity is maintained for all extracted data that is pushed to said ETL program, wherein additional queries are made for all related entity data and said related entity data is pushed into said ETL program, wherein each said dependent-query data set is validated and transformed with said ETL program, and wherein only each said validated and transformed data set is pushed into said data-warehouse system (525).

The data-warehouse system can be further extended wherein the relative age of the record to be written to said data-warehouse system as compared to its corresponding existing record is determined by comparing the relative ordering indexes of the records (520).

Potential Obvious Variations and Improvements

Those skilled in the art will have no difficulty devising myriad obvious variations and improvements to the invention, all of which are intended to be encompassed within the scope of the claims which follow.

What is claimed is:

1. A method of loading data into a data-warehouse system for use in a data-warehouse system wherein there is to be data loaded or restored for use, said system comprising at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, the method comprising the step of:

loading a first partial-backup data file,
wherein the loading of said first partial-backup data file makes the data in said first partial-backup data file available for use, at a time when no other backup data files have been loaded,
wherein said first partial-backup data file is one partial-backup data file within a series of historical partial-backup files for said data-warehouse system, and
wherein said first partial-backup data file is not a full-backup data file;
thereby loading data into the data-warehousing system, further comprising the step of:
loading at least one additional partial-backup data file,
wherein the loading of each said at least one additional partial-backup data file makes the data in each at least one additional partial-backup data file available for use, at a time when other backup data files are available, but have not been loaded,
wherein said at least one additional partial-backup data file is any partial-backup data file within a series of historical partial-backup files for said data-warehouse system,
wherein said at least one additional partial-backup data file is not a full-backup data file, and
wherein each record to be extracted from said at least one additional partial-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record, further comprising the steps of:
defining a data-containing unit for use in constructing, extracting, and validating each record to be written in said data-warehouse system from said at least one additional partial-backup file;
defining a dependent query based on database constraints or based on extrapolated relationships between data fields,
wherein said dependent query is designed to populate said data-containing unit;
performing said dependent query for each record in said at least one additional partial-backup data file,
wherein said data-containing unit is populated and pushed into said ETL program,
wherein referential integrity is maintained for all extracted data that is pushed to said ETL program, and
wherein additional queries are made for all related entity data and said related entity data is pushed into said ETL program;
validating and transforming each said dependent-query data set with said ETL program; and
pushing only each said validated and transformed data set into said data-warehouse system.

2. A method of loading data into a data-warehouse system for use in a data-warehouse system wherein there is to be data loaded or restored for use, said system comprising at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, the method comprising the step of:

loading a first partial-backup data file,
wherein the loading of said first partial-backup data file makes the data in said first partial-backup data file available for use, at a time when no other backup data files have been loaded,
wherein said first partial-backup data file is one partial-backup data file within a series of historical partial-backup files for said data-warehouse system, and
wherein said first partial-backup data file is not a full-backup data file;
thereby loading data into the data-warehousing system, further comprising the step of:
loading a full-backup data file, wherein each record to be extracted from said full-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record, further comprising the steps of:

defining a data-containing unit for use in constructing, extracting, and validating each record to be written in said data-warehouse system from said full-backup file;

defining a dependent query based on database constraints or based on extrapolated relationships between data fields, wherein said dependent query is designed to populate said data-containing unit;

performing said dependent query for each record in said full-backup data file, wherein said data-containing unit is populated and pushed into said ETL program, wherein referential integrity is maintained for all extracted data that is pushed to said ETL program, and wherein additional queries are made for all related entity data and said related entity data is pushed into said ETL program;

validating and transforming each said dependent-query data set with said ETL program; and pushing only each said validated and transformed data set into said data-warehouse system.

3. A method of loading data into a data-warehouse system for use in a data-warehouse system wherein there is to be data loaded or restored for use, said system comprising at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, the method comprising the step of:

loading a first partial-backup data file,
wherein the loading of said first partial-backup data file makes the data in said first partial-backup data file available for use, at a time when no other backup data files have been loaded,
wherein said first partial-backup data file is one partial-backup data file within a series of historical partial-backup files for said data-warehouse system, and
wherein said first partial-backup data file is not a full-backup data file;
thereby loading data into the data-warehousing system, further comprising the step of:
loading at least one additional partial-backup data file,
wherein the loading of each said at least one additional partial-backup data file makes the data in each at least one additional partial-backup data file available for use, at a time when other backup data files are available, but have not been loaded,
wherein said at least one additional partial-backup data file is any partial-backup data file within a series of historical partial-backup files for said data-warehouse system,
wherein said at least one additional partial-backup data file is not a full-backup data file, and
wherein each record to be extracted from said at least one additional partial-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record, wherein the relative age of the record to be written to said data-warehouse system as compared to its corresponding existing record is determined by comparing the relative ordering indexes of the records, wherein said relative ordering indexes of the records employs a strategy that breaks a data refresh into a backward-fill migration and a forward-fill migration, wherein the relative ordering index value for said backward-fill migration is assigned a value that will always cause a comparison of said value with an actual date of another record to result in said actual date being evaluated as newer, thus allowing the associated record under consideration to be overwritten, wherein the first introduction of any record will result in the insertion of said record into said data-warehouse system, wherein each new record is assigned a relative ordering index value of the date that said record was pushed into said data-warehouse system, wherein during said backward-fill migration, any additional records corresponding to a record already loaded in said data-warehouse system will be ignored, wherein during said forward-fill migration, a newer record will always overwrite an existing corresponding record in said data-warehouse system.

4. A method of loading data into a data-warehouse system for use in a data-warehouse system wherein there is to be data loaded or restored for use, said system comprising at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, the method comprising the step of:

loading a first partial-backup data file,
wherein the loading of said first partial-backup data file makes the data in said first partial-backup data file available for use, at a time when no other backup data files have been loaded,
wherein said first partial-backup data file is one partial-backup data file within a series of historical partial-backup files for said data-warehouse system, and
wherein said first partial-backup data file is not a full-backup data file;
thereby loading data into the data-warehousing system, further comprising the step of:
loading a full-backup data file,
wherein each record to be extracted from said full-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record,
wherein the relative age of the record to be written to said data-warehouse system as compared to its corresponding existing record is determined by comparing the relative ordering indexes of the records,
wherein said relative ordering indexes of the records employs a strategy that breaks a data refresh into a backward-fill migration and a forward-fill migration,
wherein the relative ordering index value for said backward-fill migration is assigned a value that will always cause a comparison of said value with an actual date of another record to result in said actual date being evaluated as newer, thus allowing the associated record under consideration to be overwritten,
wherein the first introduction of any record will result in the insertion of said record into said data-warehouse system,
wherein each new record is assigned a relative ordering index value of the date that said record was pushed into said data-warehouse system,
wherein during said backward-fill migration, any additional records corresponding to a record already loaded in said data-warehouse system will be ignored,
wherein during said forward-fill migration, a newer record will always overwrite an existing corresponding record in said data-warehouse system.

5. A method of loading data into a data-warehouse system for use in a data-warehouse system wherein there is to be data loaded or restored for use, said system comprising at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, the method comprising the step of:
  loading a first partial-backup data file,
    wherein the loading of said first partial-backup data file makes the data in said first partial-backup data file available for use, at a time when no other backup data files have been loaded,
    wherein said first partial-backup data file is one partial-backup data file within a series of historical partial-backup files for said data-warehouse system, and
    wherein said first partial-backup data file is not a full-backup data file;
  thereby loading data into the data-warehousing system, further comprising the step of:
  loading at least one additional partial-backup data file,
    wherein the loading of each said at least one additional partial-backup data file makes the data in each at least one additional partial-backup data file available for use, at a time when other backup data files are available, but have not been loaded,
    wherein said at least one additional partial-backup data file is any partial-backup data file within a series of historical partial-backup files for said data-warehouse system,
    wherein said at least one additional partial-backup data file is not a full-backup data file, and
    wherein each record to be extracted from said at least one additional partial-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record, further comprising the step of:
  loading a full-backup data file,
    wherein each record to be extracted from said full-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record,
    wherein the relative age of the record to be written to said data-warehouse system as compared to its corresponding existing record is determined by comparing the relative ordering indexes of the records,
    wherein said relative ordering indexes of the records employs a strategy that breaks a data refresh into a backward-fill migration and a forward-fill migration,
    wherein the relative ordering index value for said backward-fill migration is assigned a value that will always cause a comparison of said value with an actual date of another record to result in said actual date being evaluated as newer, thus allowing the associated record under consideration to be overwritten,
    wherein the first introduction of any record will result in the insertion of said record into said data-warehouse system,
    wherein each new record is assigned a relative ordering index value of the date that said record was pushed into said data-warehouse system,
    wherein during said backward-fill migration, any additional records corresponding to a record already loaded in said data-warehouse system will be ignored,
    wherein during said forward-fill migration, a newer record will always overwrite an existing corresponding record in said data-warehouse system.

6. A method of loading data into a data-warehouse system for use in a data-warehouse system wherein there is to be data loaded or restored for use, said system comprising at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, the method comprising the step of:
  loading a first partial-backup data file,
    wherein the loading of said first partial-backup data file makes the data in said first partial-backup data file available for use, at a time when no other backup data files have been loaded,
    wherein said first partial-backup data file is one partial-backup data file within a series of historical partial-backup files for said data-warehouse system, and
    wherein said first partial-backup data file is not a full-backup data file;
  thereby loading data into the data-warehousing system, further comprising the step of:
  loading at least one additional partial-backup data file,
    wherein the loading of each said at least one additional partial-backup data file makes the data in each at least one additional partial-backup data file available for use, at a time when other backup data files are available, but have not been loaded
    wherein said at least one additional partial-backup data file is any partial-backup data file within a series of historical partial-backup files for said data-warehouse system, wherein said at least one additional partial-backup data file is not a full-backup data file, and wherein each record to be extracted from said at least one additional partial-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record, further comprising the step of:

loading a full-backup data file, wherein each record to be extracted from said full-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record, wherein the relative age of the record to be written to said data-warehouse system as compared to its corresponding existing record is determined by comparing the relative ordering indexes of the records, further comprising the step of having a human user select said first partial-backup data file to be subjected to said backward-fill migration from other available backup data files, when any candidate first partial-backup files do not contain a date field that indicates the relative newness of the data as compared to other available backup data files, by evaluating the physical characteristics and known circumstances surrounding the creation of the backup data file under consideration to be said first partial-backup data file in order to assume a relative age of said selected first partial-backup data file for the purpose of implementing a strategy for employing relative ordering indexes for record loading during said backward-fill migration.

7. A data-warehouse system wherein there is to be data loaded or restored for use, said system having at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, comprising:

a first partial-backup data file, wherein the loading of said first partial-backup data file makes the data in said first partial-backup data file available for use, at a time when no other backup data files have been loaded, wherein said first partial-backup data file is one partial-backup data file within a series of historical partial-backup files for said data-warehouse system, and wherein said first partial-backup data file is not a full-backup data file, further comprising:

at least one additional partial-backup data file, wherein the loading of each said at least one additional partial-backup data file makes the data in each at least one additional partial-backup data file available for use, at a time when other backup data files are available, but have not been loaded, wherein said at least one additional partial-backup data file is any partial-backup data file within a series of historical partial-backup files for said data-warehouse system, wherein said at least one additional partial-backup data file is not a full-backup data file, and wherein each record to be extracted from said at least one additional partial-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record, further comprising:

a defined data-containing unit for use in constructing, extracting, and validating each record to be written in said data-warehouse system from said at least one additional partial-backup file;

a defined dependent query based on database constraints or based on extrapolated relationships between data fields, wherein said dependent query is designed to populate said data-containing unit;

a program to perform said dependent query for each record in said at least one additional partial-backup data file, wherein said data-containing unit is populated and pushed into said ETL program, wherein referential integrity is maintained for all extracted data that is pushed to said ETL program, wherein additional queries are made for all related entity data and said related entity data is pushed into said ETL program, wherein each said dependent-query data set is validated and transformed with said ETL program, and wherein only each said validated and transformed data set is pushed into said data-warehouse system.

8. A data-warehouse system wherein there is to be data loaded or restored for use, said system having at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, comprising:

a first partial-backup data file, wherein the loading of said first partial-backup data file makes the data in said first partial-backup data file available for use, at a time when no other backup data files have been loaded, wherein said first partial-backup data file is one partial-backup data file within a series of historical partial-backup files for said data-warehouse system, and wherein said first partial-backup data file is not a full-backup data file, further comprising:

a full-backup data file, wherein each record to be extracted from said full-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record, further comprising:

a defined data-containing unit for use in constructing, extracting, and validating each record to be written in said data-warehouse system from said full-backup file;

a defined dependent query based on database constraints or based on extrapolated relationships between data fields, wherein said dependent query is designed to populate said data-containing unit;
a program to perform said dependent query for each record in said full-backup data file,
wherein said data-containing unit is populated and pushed into said ETL program,
wherein referential integrity is maintained for all extracted data that is pushed to said ETL program,
wherein additional queries are made for all related entity data and said related entity data is pushed into said ETL program,
wherein each said dependent-query data set is validated and transformed with said ETL program, and
wherein only each said validated and transformed data set is pushed into said data-warehouse system.

9. A data-warehouse system wherein there is to be data loaded or restored for use, said system having at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, comprising:
a first partial-backup data file,
wherein the loading of said first partial-backup data file makes the data in said first partial-backup data file available for use, at a time when no other backup data files have been loaded,
wherein said first partial-backup data file is one partial-backup data file within a series of historical partial-backup files for said data-warehouse system, and
wherein said first partial-backup data file is not a full-backup data file, further comprising:
at least one additional partial-backup data file,
wherein the loading of each said at least one additional partial-backup data file makes the data in each at least one additional partial-backup data file available for use, at a time when other backup data files are available, but have not been loaded,
wherein said at least one additional partial-backup data file is any partial-backup data file within a series of historical partial-backup files for said data-warehouse system,
wherein said at least one additional partial-backup data file is not a full-backup data file, and
wherein each record to be extracted from said at least one additional partial-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record,
wherein the relative age of the record to be written to said data-warehouse system as compared to its corresponding existing record is determined by comparing the relative ordering indexes of the records,
wherein said relative ordering indexes of the records employs a strategy that breaks a data refresh into a backward-fill migration and a forward-fill migration,
wherein the relative ordering index value for said backward-fill migration is assigned a value that will always cause a comparison of said value with an actual date of another record to result in said actual date being evaluated as newer, thus allowing the associated record under consideration to be overwritten,
wherein the first introduction of any record will result in the insertion of said record into said data-warehouse system,
wherein each new record is assigned a relative ordering index value of the date that said record was pushed into said data-warehouse system,
wherein during said backward-fill migration, any additional records corresponding to a record already loaded in said data-warehouse system will be ignored,
wherein during said forward-fill migration, a newer record will always overwrite an existing corresponding record in said data-warehouse system.

10. A data-warehouse system wherein there is to be data loaded or restored for use, said system having at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, comprising:
a first partial-backup data file,
wherein the loading of said first partial-backup data file makes the data in said first partial-backup data file available for use, at a time when no other backup data files have been loaded,
wherein said first partial-backup data file is one partial-backup data file within a series of historical partial-backup files for said data-warehouse system, and
wherein said first partial-backup data file is not a full-backup data file, further comprising:
a full-backup data file,
wherein each record to be extracted from said full-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record,
wherein the relative age of the record to be written to said data-warehouse system as compared to its corresponding existing record is determined by comparing the relative ordering indexes of the records,
wherein said relative ordering indexes of the records employs a strategy that breaks a data refresh into a backward-fill migration and a forward-fill migration,
wherein the relative ordering index value for said backward-fill migration is assigned a value that will always cause a comparison of said value with an actual date of another record to result in said actual date being evaluated as newer, thus allowing the associated record under consideration to be overwritten,
wherein the first introduction of any record will result in the insertion of said record into said data-warehouse system,
wherein each new record is assigned a relative ordering index value of the date that said record was pushed into said data-warehouse system,
wherein during said backward-fill migration, any additional records corresponding to a record already loaded in said data-warehouse system will be ignored,
wherein during said forward-fill migration, a newer record will always overwrite an existing corresponding record in said data-warehouse system.

11. A data-warehouse system wherein there is to be data loaded or restored for use, said system having at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, comprising:

a first partial-backup data file,
wherein the loading of said first partial-backup data file makes the data in said first partial-backup data file available for use, at a time when no other backup data files have been loaded,
wherein said first partial-backup data file is one partial-backup data file within a series of historical partial-backup files for said data-warehouse system, and
wherein said first partial-backup data file is not a full-backup data file, further comprising:
at least one additional partial-backup data file,
wherein the loading of each said at least one additional partial-backup data file makes the data in each at least one additional partial-backup data file available for use, at a time when other backup data files are available, but have not been loaded,
wherein said at least one additional partial-backup data file is any partial-backup data file within a series of historical partial-backup files for said data-warehouse system,
wherein said at least one additional partial-backup data file is not a full-backup data file, and
wherein each record to be extracted from said at least one additional partial-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record, further comprising:
a full-backup data file,
wherein each record to be extracted from said full-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record,
wherein the relative age of the record to be written to said data-warehouse system as compared to its corresponding existing record is determined by comparing the relative ordering indexes of the records,
wherein said relative ordering indexes of the records employs a strategy that breaks a data refresh into a backward-fill migration and a forward-fill migration,
wherein the relative ordering index value for said backward-fill migration is assigned a value that will always cause a comparison of said value with an actual date of another record to result in said actual date being evaluated as newer, thus allowing the associated record under consideration to be overwritten,
wherein the first introduction of any record will result in the insertion of said record into said data-warehouse system,
wherein each new record is assigned a relative ordering index value of the date that said record was pushed into said data-warehouse system,
wherein during said backward-fill migration, any additional records corresponding to a record already loaded in said data-warehouse system will be ignored,
wherein during said forward-fill migration, a newer record will always overwrite an existing corresponding record in said data-warehouse system.

12. A data-warehouse system wherein there is to be data loaded or restored for use, said system having at least one computing device communicatively coupled with a large dataset, said large dataset having at least one storage device, said at least one storage device containing a full-backup data file and at least one partial-backup data file, said data files containing real-world entity data, said computing device having a Extraction Load Program (ETL) program to subject the data intended to be loaded to a transform stage according to data-warehouse-specific rules, comprising:

a first partial-backup data file,
wherein the loading of said first partial-backup data file makes the data in said first partial-backup data file available for use, at a time when no other backup data files have been loaded,
wherein said first partial-backup data file is one partial-backup data file within a series of historical partial-backup files for said data-warehouse system, and
wherein said first partial-backup data file is not a full-backup data file, further comprising:
at least one additional partial-backup data file,
wherein the loading of each said at least one additional partial-backup data file makes the data in each at least one additional partial-backup data file available for use, at a time when other backup data files are available, but have not been loaded,
wherein said at least one additional partial-backup data file is any partial-backup data file within a series of historical partial-backup files for said data-warehouse system,
wherein said at least one additional partial-backup data file is not a full-backup data file, and
wherein each record to be extracted from said at least one additional partial-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record, further comprising:
a full-backup data file,
wherein each record to be extracted from said full-backup data file for loading into said data-warehouse system is only allowed to be written to said data-warehouse system if either the record to be written to said data-warehouse system is not already represented in said data-warehouse system or the record to be written to said data-warehouse system is designated as newer than its corresponding existing record,
wherein the relative age of the record to be written to said data-warehouse system as compared to its corresponding existing record is determined by comparing the relative ordering indexes of the records, wherein a human user selects said first partial-backup data file to be subjected to said backward-fill migration from other available backup data files, when any candidate first partial-backup files do not contain a date field that indicates the relative newness of the data as compared to other available backup data files, by evaluating the physical characteristics and known circumstances surrounding the creation of the backup data file under consideration to be said first partial-backup data file in order to assume a relative age of said selected first partial-backup data file for the purpose of implementing a strategy for employing relative ordering indexes for record loading during said backward-fill migration.

* * * * *